US005186834A

United States Patent [19]
Arai

[11] Patent Number: 5,186,834
[45] Date of Patent: Feb. 16, 1993

[54] SCRAPER FILTER SYSTEM

[76] Inventor: Koichi Arai, Arai Corporation, 1390-1, Kurami, Samukawa-cho, Koza-gun, Kanagawa-ken, Japan

[21] Appl. No.: 740,960

[22] Filed: Aug. 6, 1991

[30] Foreign Application Priority Data

Aug. 16, 1990 [JP] Japan .................... 2-214964

[51] Int. Cl.⁵ .................... B01D 29/48; B01D 29/64
[52] U.S. Cl. .................... 210/413; 210/374; 210/415; 210/497.1; 210/238; 209/389; 100/117
[58] Field of Search ............ 210/352, 374, 408, 413, 210/414, 415, 497.1, 238; 209/389; 100/117

[56] References Cited

U.S. PATENT DOCUMENTS

| | | | |
|---|---|---|---|
| 854,288 | 5/1907 | Goreau | 210/414 |
| 2,607,679 | 8/1952 | Weiss | 100/117 |
| 3,216,818 | 3/1964 | Koelsch | 100/117 |
| 3,695,173 | 10/1972 | Cox | 210/415 |
| 3,721,184 | 3/1973 | French | 100/117 |
| 3,938,434 | 2/1976 | Cox | 100/117 |
| 4,041,854 | 8/1977 | Cox | 100/117 |
| 4,217,220 | 8/1980 | Egli | 210/413 |
| 4,347,134 | 8/1982 | Svehaug | 100/117 |
| 5,061,366 | 10/1991 | Arai | 210/415 |
| 5,087,365 | 2/1992 | Davis | 210/415 |

FOREIGN PATENT DOCUMENTS

| | | | |
|---|---|---|---|
| 395044 | 10/1990 | European Pat. Off. | 210/415 |
| 2-211998 | 8/1990 | Japan | 210/415 |

Primary Examiner—Stanley S. Silverman
Assistant Examiner—Thomas M. Lithgow

[57] ABSTRACT

A scraper filter system, which comprises a screw-formed spiral impeller within a cylindrical filter element, and a scraper in the groove formed along the spiral end of the impeller for engagement with the internal surface of the filter element for scrapingly removing solid components deposited on the surface of the filter element.

The scraper is comprised of a plurality of separate arcuate segments each being urged radially in the external direction by a resilient member, and also includes a securing element for preventing movement of each segment in the groove with respect to the spiral edge of the spiral impeller.

19 Claims, 4 Drawing Sheets

SCRAPER FILTER SYSTEM

BACKGROUND OF THE INVENTION

1. Field of the Invention

The present invention relates to a scraper filter system including scraper means, and more particularly to a filter system in which an improved scraper means consisting of a plurality of separate scraper segments is provided and proper scraping operation is steadily maintained.

2. Description of the Prior Art

In the prior art scraper filters disclosed in Japanese patent applications, such as the application nos. 1-107834 and 1-223302 by the same applicant as in the present invention, a scraper made of a wear resistant material is provided at the edge of a spiral impeller in a cylindrical filter, constantly engaged with the inner area of the cylindrical filter, and a filtrate from a feed liquid such as highly viscous liquid food is discharged from the outside of the cylindrical filter while the feed liquid is delivered with no loss of feeding pressure from the inlet to the outlet port for the feed liquid until the concentrated food solid is finally taken out from the cylinder. The filters have an advantage that since the scraper is prepared in the ways that coil springs are incorporated into the scraper made of a wear resistant long plastic board and fixed in a groove formed along the spiral edge of the impeller, the edge of the scraper is closely engaged with the inner area of the cylindrical filter in virtue of expansion of the coil springs.

On the other hand, the aforementioned prior art filters with scrapers have the following problems.

When the pressure of the scraper to the filter becomes high due to either extremely narrow slits or holes on the filter or excessively high viscosity of a feed liquid, abrasion on the edge of the scraper much progresses, and the length of the spiral scraper is reduced at large, which makes the scraper shifted along its groove by the reduced length toward rotating direction of the spiral impeller, resulting in occurrance of the scraper's not engageing to the filter at the feed liquid inlet in the cylindrical filter.

The phenomenon described above is mathematically explained as follows.

When the diameter of the cylindrical filter is R(cm) and a worn length on the scraper is $\alpha$(mm), the 1 pitch length of the scraper worn by $\alpha$(mm) and engages the filter surface can be expressed:

$$(R - 0 \cdot \alpha)\pi (cm) \quad (1)$$

(the length is considered as a circle)

On the other hand, since the 1 pitch length of the scraper with no wear and engage with the filter surface is regarded as the same as the inner circumference of the filter, the 1 pitch length can be expressed:

$$R\pi (cm) \quad (2)$$

(the length is considered as a circle)

Since the reduced length in the 1 pitch length of the scraper worn by $\alpha$(mm) and contacted to the filter surface is the length difference between (2) and (1), the reduced length in the 1 pitch length of the scraper can be expressed:

$$R\pi(cm) - (R - 0 \cdot \alpha)\pi(cm) = 0 \cdot \alpha \cdot \pi(cm) \quad (3)$$

When the number of the pitch in the whole spiral impeller is n, the absolutely reduced length of the scraper can be expressed:

$$0 \cdot \alpha \cdot \pi \times n (cm) \quad (4)$$

And when $\alpha$ is 2(mm) and n is 20, the absolutely reduced length of the scraper becomes from formula(4):

$$0.2 \times 3.14 \times 20 (cm) = 12.56 (about\ 13)(cm)$$

As mentioned above, there is the problem in our previously devised filters with scrapers which were filled as Japanese patents (the application Nos. 1-107834 and 1-223302). That is as the wear of the scraper increases, the length of the scraper becomes shorter, the scraper is shifted by the reduced length toward the rotating direction of the spiral impeller, which brings about reduction of scraping efficiency in the way that between the scraper and the filter some unengaged area occurs.

SUMMARY OF THE INVENTION

Accordingly, an object of the present invention is to provide an improved structure for the scraper in which despite being suffered from some wear of the scraper the scraper is never shifted and is able to be constantly engaged with the filter surface.

Realizing an objective structure of a scraper is achieved by the present invention in which a scraper is independently separated into a plurality of scraper segments and attached along the edge of a spiral impeller located in a cylindrical filter.

Another object of the present invention is to provide a spiral impeller which is mounted for rotation within a cylinder around the inner surface of which is provided with a plurality of filter slits or holes having a desired dimension is set in a cylinder.

A feature of the present invention is that a scraper system in which it is separated into a plurality of scraping segments associated with springs each end of which is always engaged closely with the inner surface of cylindrical filter, and each scraper segment is firmly attached in position on the spiral edge of the impeller, so that each scraper segment is never be shifted.

Another object of the present invention is to prevent a spiral impeller from losing its feeding pressure by providing every adjacent scraper segments to be overlapped at each end.

Each scraper segment is integrally combined with a leaf spring by which the end of each segment is always maintained to engage the inner surface of the filter and each scraper segment is firmly attached into a groove formed on a separate section on the spiral edge of the impeller.

Further, each scraper segment associated with a coil spring is attached into a groove formed on a separate section of the spiral edge of the impeller, so that the end of each segment is raised up by the force of the spring.

Still further object of the present invention is to provide a groove with two projections corresponding to the length of a scraper segment in order to prevent it from being shifted.

Also, a feature of the present invention is that the one side of each segment which is faced toward the filter cake discharge outlet and exposed at a higher pressure from high content of solid matter is protectively made of a more wear resistive material than that in other side of each segment which is faced toward the feed liquid inlet and exposed at lower pressure.

A frusto-cone can be used as well as a cylinder having a uniform diameter as a filter body.

A still another feature of the present invention is that along the inner surface of said cylinder or cone is fixedly coiled with a long wire rod of hard material such as stainless steel the cross section of which is a isosceles triangle to form a filter slit between every adjacent windings of the rod.

The wire rod is coiled in a way that the vertex of triangle is directed to outside of the cylindrical surface and that the base of each triangle is directed to inside to flush with each other.

The cross section of the wire rod is a circle and that the rod is coiled along the inner area of a cylindrical or conical surface to form a filter slit between every adjacent windings.

In the process of transferring a feed liquid by the rotation of the spiral impeller from the inlet to the outlet in a cylinder the feed liquid is continuously being filtrated in the way that its filtrate passed through the filter slits provided around the cylinderical surface is continuously taken out from the outside of the cylinder. On the other hand, as the solid matter of the feed liquid which cannot pass through the filter slits is gradually transferred toward the outlet of the cylinder by the scraper segments attached along the spiral edge of the impeller, the concentration of the solid matter gradually becomes higher until the solid matter is finally released from the outlet of the cylinder.

The most important effect of the present invention is that since the scraper system of the present invention is composed of a plurality of discrete scraping segments which are strongly prevented from being moved or shifted from their definite positions on the spiral edge of the impeller along with the end of each segment being always engage with the inner cylindrical surface of the filter by force of springs, there never occurs any shifts of scraper segments toward the axis of the impeller whatever wear of the scraper segments occurs on account of any strong rotation of the spiral impeller.

Thus, the separately disposed scraper segments on the spiral edge of the impeller do prevent any scraper segments from having any unengaged area on the filter due to the wear of the scrapers.

Moreover, since every adjacent scraper segments are overlapped at each end, such a disadvantages as occurrence of vacant space between adjacent scraper segments is prevented from even if there occurs some wear of scraper segments.

Further, providing each groove formed on the spiral edge of the impeller with two projections corresponding to the length of a scraper segment will enable for each scraper segment never to be shifted.

Further, since in said each groove each separate scraper segment is combined with a leaf spring or a coil spring beneath the base of each scraper segment, the end of each scraper segment constantly receives force of the spring which makes each scraper segment constantly engageable closely with the inner surface of the cylindrical filter.

Further, each separate scraper segment is scarcely damaged by wear because the one side of each segment, which is faced toward the outlet of the cylinder and exposed at a higher pressure from the concentrated solid matter of a feed liquid, is made of a higher wear resistant material than that in the other side of each segment, which is faced toward the inlet of the cylinder and exposed at lower pressure from the feed liquid.

Further, a frusto-conical as well as a straight cylindrical shape can be used as a filter element.

Further along the inner area of said cylinder or cone is securely coiled a wire rod of a hard material such as stainless steel the cross section of which is a isosceles triangle or circle to form a filter slit between every adjacent windings.

DETAILED DESCRIPTION OF THE PREFERRED EMBODIMENTS

Figure 1:
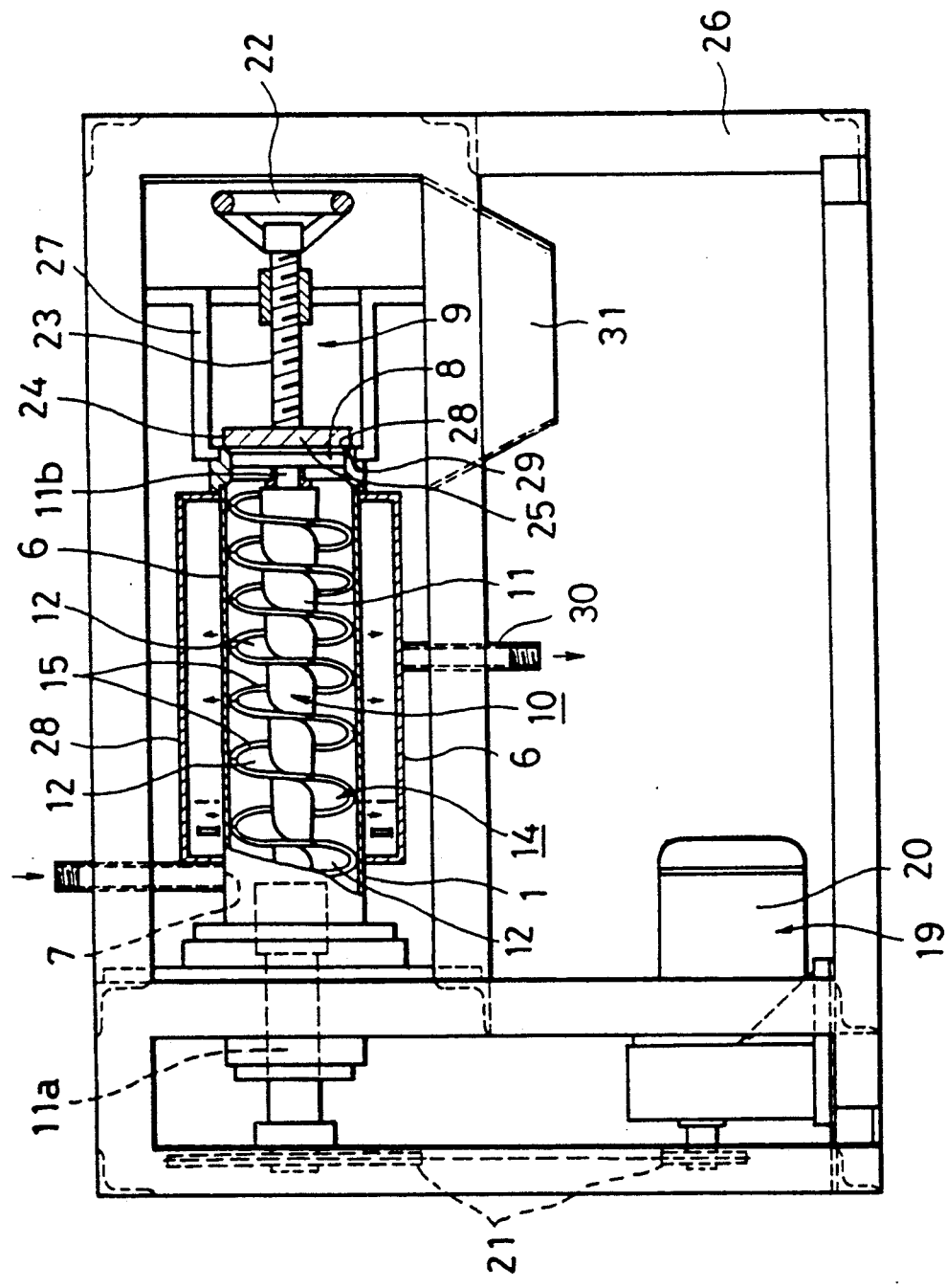
FIG. 1 is a side view partly cut away of a scraper filter system according to the present invention.

Preferred embodiments according to the invention will now be described with reference to the accompanying drawings.

The embodiment described herein is suitable for soy milk separation from soybean slurry.

A reference numeral 1 denotes a cylindrical filter element, which comprises a wire rod filter member 2 having a triangular section wound as a spiral form around an inner surface of a cylindrical support member 3 having a plurality of flow holes. The wire member 2 is retained with its accute apex 2b in a spiral groove 4 formed along the inner surface of support member 3, so as to permit all adjacent surfaces a of wire member 2 to be flush with each other, leaving a spiral filter slit 5 of a definite width around the surface.

A reference numeral 6 denotes a cylindrical casing selectively enclosing one or more filter elements 1. At one end of the casing 6, a feed liquid inlet 7 is provided. At another end, a filter cake discharge assembly 9 including a discharge outlet 8 is provided.

Figure 2:
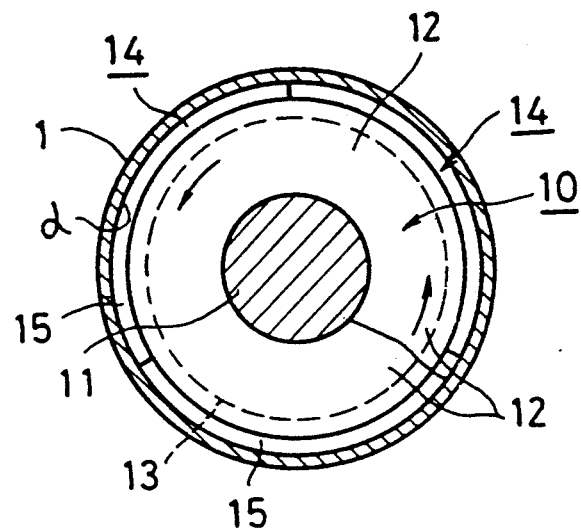
FIG. 2 is a sectional view taken along the line II—II of FIG. 1.
Figure 3:
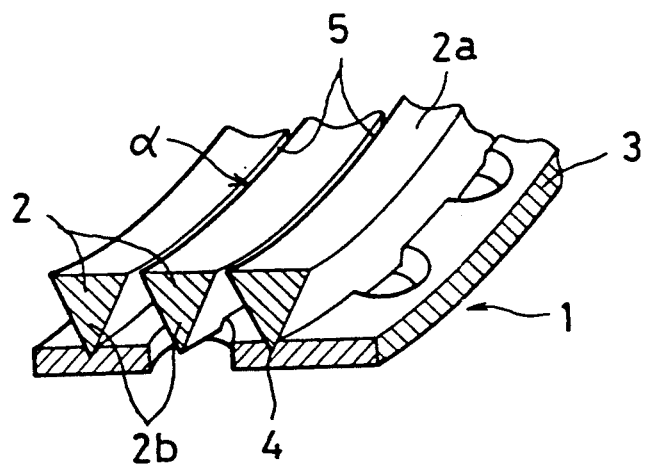
FIG. 3 is a perspective view partly cut away of a cylindrical filter element.
Figure 4:
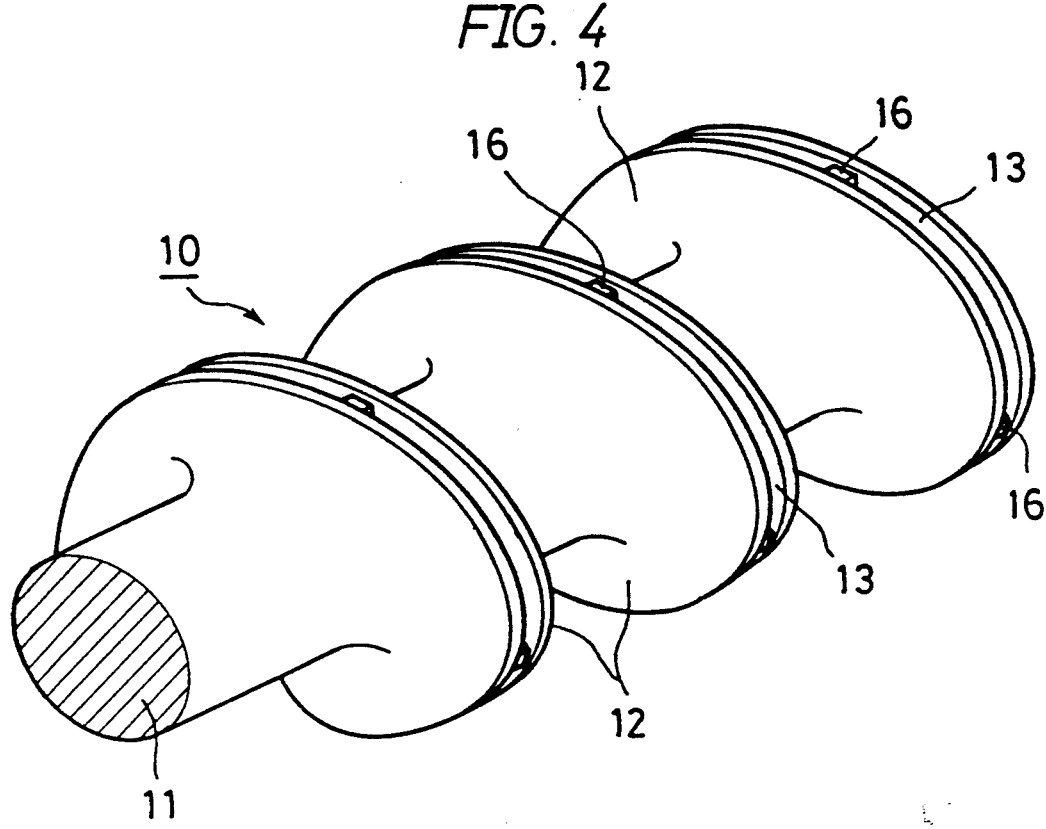
FIG. 4 is an enlarged fragmentary perspective view of a spiral impeller.

As shown in FIG. 2, a screw member or rotor 10 is formed of a screw-formed spiral impeller 12. The spiral impeller 12 consists of a plurality of discrete blades 12a secured to the rotating shaft 11, and is rotatably supported within the filter element 1 so as to leave a small clearance against the internal surface of filter element 1.

Alternatively, the spiral impeller 12 can be formed as an integral member(not illustrated) instead of discrete blades 12a.

As shown in FIG. 1, spiral impeller 12 is formed to have a definite diameter throughout the length thereof. The spiral is formed so as to convey the liquid in the direction from the inlet 7 to outlet 8, and is further formed so that the pitch gradually decreases as the outlet 8 is approached for applying an efficient squeeze effect on the liquid.

Figure 5:
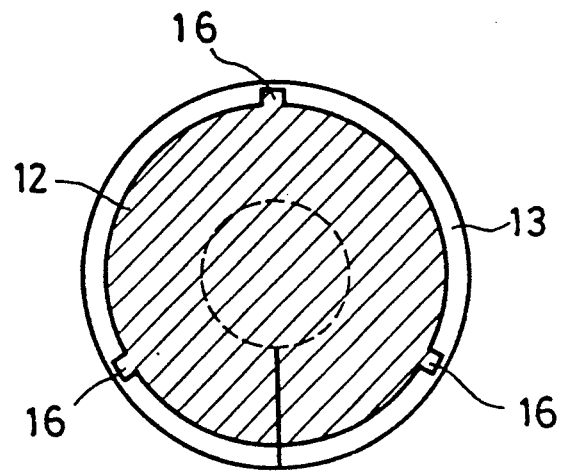
FIG. 5 is a sectional view along one pitch of the impeller snd is viewed from the axial direction.
Figure 6:
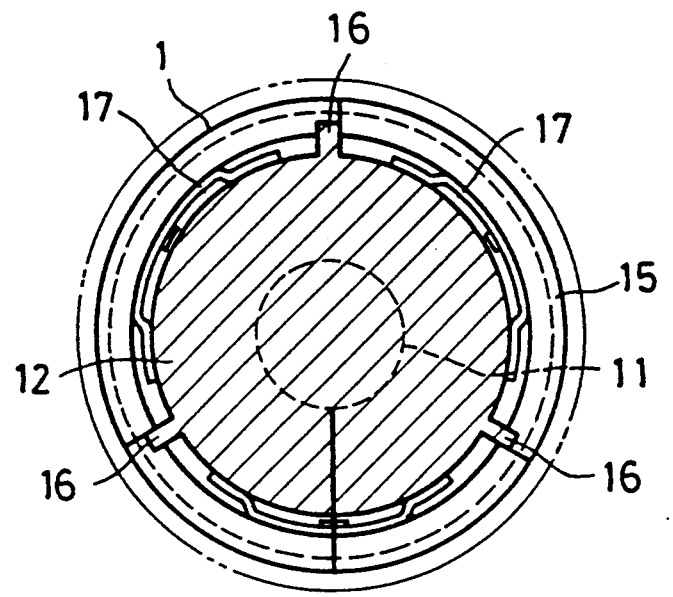
FIG. 6 is a sectional view showing discrete separate scraper segments which slidingly engage the filter surface of the cylindrical element.
Figure 7:
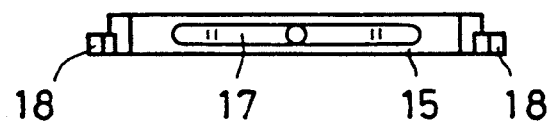
FIG. 7 is a inside view of a scraper segment with a leaf spring.
Figure 8:
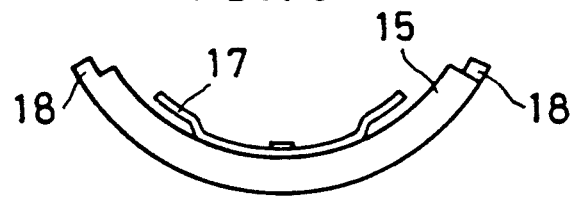
FIG. 8 is a plan view of a segment.
Figure 9:
FIG. 9 is a side view of the segment.

As hereinafter illustrated in FIG. 5, by successively increasing a diameter of shaft 11 with the pitch size maintained, the same effect is also attained for increasing squeeze filter operation.

Also, instead of the above mentioned leaf spring 17, a separate coil spring may be used, which is retained with its end portion received in a recess formed in the groove 13 (not illustrated).

The material for scraper segments 15 is not always specifically restricted. However, a hard synthetic resin such as teflon or a wear resistant material is preferable.

Also, the following arrangement of the scraper means 14 is possible. In such an arrangement, segments 15 near the filter cake discharge outlet including a higher internal pressure are formed of a higher wear resistant material, while the segments located near the feed liquid inlet are of a lower wear resistant material.

A numeral 19 denotes drive means connected to a rotating shaft 11 of screw member 10, which is connected to an electric motor through belt or gear means. The shaft 11 has its both ends 11a and 11b rotatably supported.

Filter cake discharge assembly 9 includes a cap assembly 25 and a support frame 27. The former includes hand-operating wheel 22, threaded shaft 23 and cap member 24, and the latter forms a part of frame assembly 26 and threadably supports the above threaded shaft 23. The opening extent can be desirably adjusted between the first tapered surface of cap member 24 and another tapered surface of discharge outlet 8 which faces the first tapered surface.

Returning to FIG. 1, around filter element 1 is formed a filtrate collection cylinder 30, to which a filtrate outlet 31 is attached. A numeral 32 denotes a hopper beneath the outlet 8.

In operation, a feed liquid to be filtered such as soybean raw slurry is fed through the feed liquid inlet after screw member 10 is rotated by drive means 13. As the liquid is transported according to the rotation of the spiral impeller 12 through the cylinder, the filtrate passed through the filter slit is collected as soybean milk, which is drained through filtrate outlet 31a.

Even in the case of processing a substance such as soybean slurry, which is adhesive and sticky, the filter cakes can be readily removed, because the spiral impeller 12 according to the invention is free from any obstacles, such as stays for supporting the scraper means which can prevent removing of deposited filter cakes. As a result, filter cakes are successively transferred without causing blinding of filter elements during filter operation.

As the spiral impeller 12 is rotated, the filter cakes are successively pushed forward. The density of filter cakes is gradually increased as the discharge outlet is approached, that is, the liquid content gradually decreases.

In addition, the rotary shaft 11 can be formed to successively increase its diameter, and spiral impeller 12 is formed to decrease its pitch, thereby increasing squeeze effect to gradually accumulate filter cakes near the cake discharge outlet 8.

The clearance between the chamfered fringes of closing member 17a and discharge outlet 8 can be adjusted by timely operating the wheel. As a result, filter cakes containing a desired moisture content can be discharged.

Indeed, wear of each scraper segment 15 during rotation of screw member 10 is invevitable, because it always scrapingly engages with the filtering surface of filter element 1. However, the problem is specifically eliminated according to the present invention as stated below.

As has been explained previously, resilient engagement of each scraper segment 15 with the filtering surface is always effectively maintained by means of resilient means such as a leaf spring 17 or coiled spring. Further, each projection 16 is effective for completely preventing each segment 15 from being axially displaced along the spiral groove 13. Accordingly, even if the length around the spiral edge is reduced due to wear, there causes an external shift of segments merely in the radial direction, without causing any undesired movement within and along the spiral groove 13.

In addition, each overlapped portion 18 of the ends of each segment provides an advantage to maintain such overlapped condition even when the arcuate external edge is reduced in its peripheral length due to wear of the scraping surface. Also, engagement of scraper means with the filtering surface is normally maintained for preventing any trouble such as leakage of the pressure required for proper filter operation.

What is claimed is:

1. A scraper filter device comprising: a filter element of a cylindrical or conical form having a cylindrical wall formed with a filter surface, in which a plurality of filter openings of a predetermined dimension are formed;

a spiral impeller mounted for rotation with respect to a longitudinal axis along the internal surface of said filter element;

scraper means disposed around the spiral edge of said spiral impeller;

said means including a plurality of separate arcuate segments each being urged radially and externally by a resilient member means for resiliently engaging with said filter surface, each of said segments not being rigidly attached to the sprial impeller along the entire length of said segment whereby all the segments are moveable in said external radial direction over the entire length thereof.

2. A scraper filter device according to claim 1, wherein both ends of each of said scraper segments are overlapped with corresponding ends of adjacent segments.

3. A scraper filter device according to claim 1 or 2, wherein said resilient member includes a leaf spring being secured inside said each of scraper segments, said spring being secured within a defined groove for each scraper segment, and said segment being urged radially in the external direction.

4. A scraper filter device according to claim 1 or 2, wherein said resilient member includes a coiled spring being secured inside said each of scraper segments, said spring being secured within a defined groove for each scraper segment, and said segment being urged in radially external direction.

5. A scraper filter device according to claim 1, wherein said filter surface is formed of a wire rod having a triangular cross section wound along the inner surface of the cylindrical wall, leaving acontinuous spiral filter slit formed between every adjacent windings of said wire rod, which is embedded in said inner surface with its acute apex edge and is flush with each base surface facing the center of the cylinder.

6. A scraper filter device according to claim 1, wherein said filter surface includes a spiral coil formed of a wire rod having a circular cross section attached along the inner surface of the cylindrical wall, and said wire rod is wound so as to leave a continuous spiral filter slit between every adjacent windings of said wire rod.

7. A scraper filter device according to claim 1, wherein a number of projections is being disposed in a groove formed along a periphery of said spiral impeller, said projections being positioned from each other at a distance corresponding to the length of said scraper segment, so they engage with the ends of said scraper segments to prevent a movement of said segments along said spiral edge.

8. A scraper filter device according to claim 2, wherein a number of projections is being disposed in a groove formed along a periphery of said spiral impeller, said projections being positioned from each other at a distance corresponding to the length of said scraper segment, so they engage with the ends of said scraper segments to prevent a movement of said segments along said spiral edge.

9. A scraper filter device according to claim 3, wherein a number of projections is being disposed in a groove formed along a periphery of said spiral impeller, said projections being positioned from each other at a distance corresponding to the length of said scraper segment, so they engage with the ends of said scraper segments to prevent a movement of said segments along said spiral edge.

10. A scraper filter device according to claim 4, wherein a number of projections is being disposed in a groove formed along a periphery of said spiral impeller, said projections being positioned from each other at a distance corresponding to the length of said scraper segment, so they engage with the ends of said scraper segments to prevent a movement of said segments along said spiral edge.

11. A scraper filter device according to claim 1, wherein each of said scraper segments includes a first part facing a filter cake discharge outlet and a second part facing a feed liquid inlet, wherein said first part is made of a material having higher wear resistance than a material said second part is made of.

12. A scraper filter device according to claim 2, wherein each of said scraper segments includes a first part facing a filter cake discharge outlet and a second part facing a feed liquid inlet, wherein said first part is made of a material having higher wear resistance than a material said second part is made of.

13. A scraper filter device according to claim 7, wherein each of said scraper segments includes a first part facing a filter cake discharge outlet and a second part facing a feed liquid inlet, wherein said first part is made of a material having higher wear resistance than a material said second part is made of.

14. A scraper filter device according to claim 8, wherein each of said scraper segments includes a first part facing a filter cake discharge outlet and a second part facing a feed liquid inlet, wherein said first part is made of a material having higher wear resistance than a material said second part is made of.

15. A scraper filter device according to claim 9, wherein each of said scraper segments includes a first part facing a filter cake discharge outlet and a second part facing a feed liquid inlet, wherein said first part is made of a material having higher wear resistance than a material said second part is made of.

16. A scraper filter device according to claim 10, wherein each of said scraper segments includes a first part facing a filter cake discharge outlet and a second part facing a feed liquid inlet, wherein said first part is made of a material having higher wear resistance than a material said second part is made of.

17. A scraper filter device according to claim 1, wherein said filter element comprises a cylinder having an axially identical diameter.

18. A scraper filter device according to claim 1, wherein said filter element comprises a frusto-conical element having a gradually varying diameter along the axis.

19. A scraper filter device according to claim 1, wherein said filter element comprises a cylindrical part joined with a frusto-conical part.

* * * * *

UNITED STATES PATENT AND TRADEMARK OFFICE
CERTIFICATE OF CORRECTION

PATENT NO. : 5,186,834
DATED : February 16, 1993
INVENTOR(S) : Koichi Arai

It is certified that error appears in the above-identified patent and that said Letters Patent is hereby corrected as shown below:

On the title page, cancel the following: "[76] Inventor: Koichi Arai, Arai Corporation, 1390-1, Kurami, Samukawa-cho, Koza-gun, Kanagawa-ken, Japan" and insert instead the following: --[75] Inventor: Koichi Arai, Kanagawa, Japan--; after item [75], insert the following assignee data: --[73] Assignee: Arai Corporation, Kanagawa, Japan--. After "M. Lithgow", before the item [57], insert the following: --Attorney, Agent, or Firm - Nikolay Parada--.

Signed and Sealed this

Seventh Day of December, 1993

*Attest:*

BRUCE LEHMAN

*Attesting Officer*   Commissioner of Patents and Trademarks